United States Patent
Nelson et al.

(10) Patent No.: US 9,656,633 B2
(45) Date of Patent: May 23, 2017

(54) METHODS AND SYSTEMS FOR A VEHICLE COMPUTING SYSTEM TO COMMUNICATE WITH A DEVICE

(71) Applicant: FORD GLOBAL TECHNOLOGIES, LLC, Dearborn, MI (US)

(72) Inventors: Thomas Nelson, Plymouth, MI (US); David Anthony Hatton, Berkley, MI (US); Hussein F. Nasrallah, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 132 days.

(21) Appl. No.: 14/551,330

(22) Filed: Nov. 24, 2014

(65) Prior Publication Data

US 2016/0144826 A1 May 26, 2016

(51) Int. Cl.
| | |
|---|---|
| *B60R 25/24* | (2013.01) |
| *H04W 4/00* | (2009.01) |
| *H04B 1/3822* | (2015.01) |
| *B60R 16/023* | (2006.01) |
| *B60R 16/037* | (2006.01) |

(52) U.S. Cl.
CPC .......... *B60R 25/241* (2013.01); *B60R 16/023* (2013.01); *H04B 1/3822* (2013.01); *H04W 4/008* (2013.01); *B60R 16/037* (2013.01)

(58) Field of Classification Search
CPC ... B60R 25/241; B60R 16/023; B60R 16/037; H04W 4/008; H04B 1/3822
See application file for complete search history.

(56) References Cited

U.S. PATENT DOCUMENTS

| | | | |
|---|---|---|---|
| 6,937,158 B2 | 8/2005 | Lansford et al. | |
| 7,324,833 B2 | 1/2008 | White et al. | |
| 8,346,310 B2 | 1/2013 | Boll et al. | |
| 8,868,254 B2 | 10/2014 | Louboutin | |
| 9,357,368 B2 * | 5/2016 | Nelson | H04W 4/22 |
| 9,369,830 B2 * | 6/2016 | Nelson | H04W 4/008 |
| 2008/0176537 A1 | 7/2008 | Smoyer et al. | |
| 2009/0106052 A1 | 4/2009 | Moldovan | |
| 2013/0006674 A1 | 1/2013 | Bowne et al. | |

(Continued)

FOREIGN PATENT DOCUMENTS

FR 2965435 A1 3/2012

OTHER PUBLICATIONS

Start your car from your wrist with GM's app for the Galaxy Gear 2, by Andrew Del-Colle Feb. 26, 2014, pp. 1-6.*

(Continued)

*Primary Examiner* — Richard Camby
(74) *Attorney, Agent, or Firm* — Jennifer Stec; Brooks Kushman P.C.

(57) ABSTRACT

A smartwatch having at least one controller in communication with an user interface and a transceiver. The transceiver configured to communicate with a nomadic device. The at least one controller configured to, in response to a wireless signal having a unique user identifier received at the nomadic device, receive a control function from an application corresponding to the unique user identifier. The at least one controller may be further configured to configure the user interface based on the control function.

14 Claims, 7 Drawing Sheets

(56) References Cited

U.S. PATENT DOCUMENTS

2013/0099892 A1 4/2013 Tucker et al.
2013/0102300 A1 4/2013 Sigal et al.

OTHER PUBLICATIONS

Thompson, iBeacon Auto: Your Car is a Beacon, (http://beekn.net/author/beekril) 2014, 7 pages, Toronto, Canada.
Barry, CES 2014: Samsung Smartwatch to Interface with BMWs, (http//www.usatoday.com/story/money/cars/2014/01/06/reviewed-ces-bmw . . . ) USA Today, 2014, 2 pages, Las Vegas, NV.
Schumacher, Wearables in the Automotive Industry, (http://www.wearable-technologies.com/2014/05/wearables-in-the-car/) Wearable Technologies, 2014, 4 pages, Berlin.

\* cited by examiner

METHODS AND SYSTEMS FOR A VEHICLE COMPUTING SYSTEM TO COMMUNICATE WITH A DEVICE

TECHNICAL FIELD

The present disclosure generally relates to vehicle systems, and more particularly, to systems and methods using applications on mobile devices with vehicle systems.

BACKGROUND

The smart phone has created application developers to bring additional features and functions to the user's mobile phone. These features and functions have included fitness, music, and navigation applications. The smart phone may be configured to include Bluetooth Low Energy (BLE) technology. With the introduction of BLE, accessory devices that communicate with the smart phone have become popular. An example of an accessory device includes a smartwatch.

SUMMARY

In at least one embodiment, a smartwatch device having a user interface and at least one controller in communication with a transceiver and the user interface. The transceiver configured to communicate with a nomadic device. The at least one controller configured to, in response to a wireless signal having a unique user identifier received at the nomadic device, receive a control function from an application corresponding to the unique user identifier. The at least one controller may be further configured to configure the user interface based on the control function.

In at least one embodiment, a vehicle computing system comprising at least one controller in a vehicle network communicating with a wireless transceiver. The wireless transceiver may include a wireless protocol. The at least one controller may be configured to transmit the wireless protocol with a unique user identification based on a predetermined condition The at least one controller may be further configured to receive a confirmation that a nomadic device launched an application based on the unique user identification and is in communication with the application via the transceiver. The at least one controller may be further configured to receive one or more control functions from a smartwatch in communication with the nomadic device based on the application. The at least one controller may be further configured to transmit the one or more control functions to a control module via the vehicle network.

In at least one embodiment, a method may wirelessly receive a signal having an identifier from a vehicle computing system. The method may, in response to the signal, search for an application that corresponds to the identifier. The method may execute one or more vehicle functions at a controller based on the application. The method may transmit the one or more vehicle functions to a smartwatch. The method may configure a user interface input at the smartwatch in communication with the controller based on the one or more vehicle functions.

DETAILED DESCRIPTION

Figure 1:
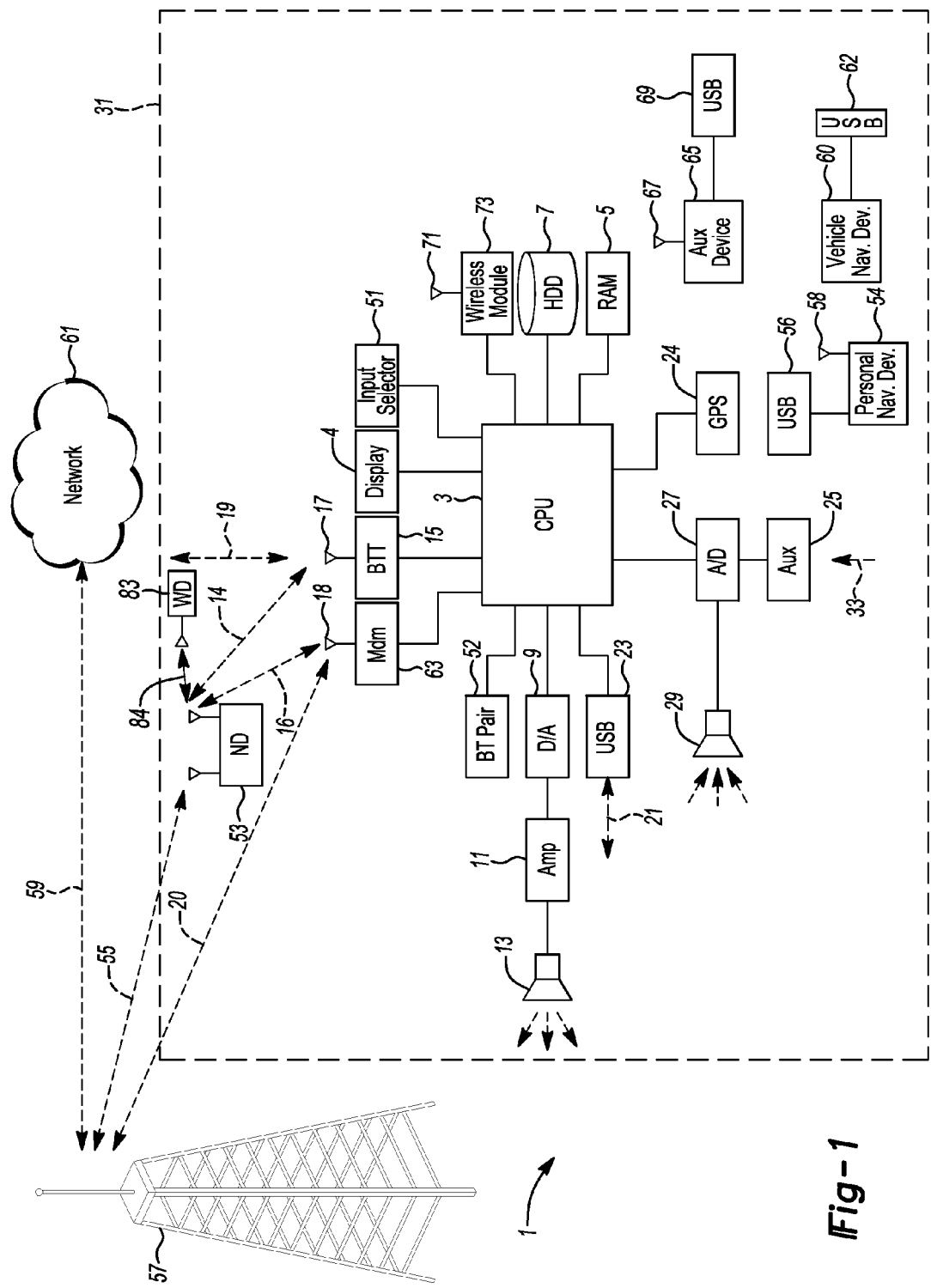
FIG. 1 is an exemplary block topology of a vehicle infotainment system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle may include a computing system that is configured to allow a communication link between one or more wireless devices (e.g., nomadic device, wearable device, etc.). A nomadic device may communicate with a wearable device such as a smartwatch. The nomadic device may also establish communication link with the vehicle computing system using wireless and/or wired technology. The communication link enables the vehicle computing system to connect to application(s) on the nomadic device. The information communicated via the application(s) between the vehicle computing system and the nomadic device may include internet radio, social media information, and/or navigation data. The applications may also communicate information to the vehicle computing system based on input received at the smartwatch in communication with the nomadic device. In one example, the smartwatch input may include vehicle controls such as locking and unlocking the vehicle doors, opening the trunk, and starting the powertrain. The applications at the nomadic device and/or smartwatch may include driver safety related information including, but not limited to, 24-Hour roadside assistance, 911 ASSIST™ and/or call center services.

The one or more applications on the nomadic device may have several states of operation including, but not limited to, enabled running in the foreground, enabled running in the background, and/or disabled. The application state of operation may determine whether the vehicle computing system may receive data once communication is established with the nomadic device. The application state of operation at the nomadic device may also determine whether information is presented to the smartwatch. The vehicle computing system and smartwatch may require that the application on the smart phone be enabled and running in the foreground such that the system may communicate with the application. For example, if the nomadic device, such as a smart phone, establishes communication with the vehicle computing system, the application(s) that is either running in the background and/or disabled on the smart phone may not communicate data with the vehicle computing system and/or the smartwatch.

The method and system for initiating (i.e., launching) an application on the nomadic device once communication with the vehicle computing system is established may be disclosed in this document. The vehicle computing system includes one or more applications executed on the hardware of the system to communicate with the nomadic device. The vehicle computing system may communicate with the nomadic device based on one or more wireless technologies. This disclosure may allow for the vehicle computing system to provide a means of sending wakeup notifications to the nomadic device using wireless technology (e.g., Bluetooth Low Energy). The nomadic device may recognize communication with the vehicle computing system and present one or more vehicle control selections to the smartwatch. This disclosure may also allow for the vehicle computing system to automatically launch one or more application at the nomadic devices via the wakeup notification so that the smartwatch may be enabled to operate one or more vehicle controls.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system may include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point. The nomadic device 53 may also be used to communicate 84 with an accessory device such as a wearable device 83 (e.g., smartwatch, smart glasses, etc.). The nomadic device 53 may communicate 84 one or more control functions to the wearable device 83. For example, the nomadic device 53 may enable the wearable device 83 to accept a phone call, enable a mobile application, receive notifications, and/or a combination thereof. In another example, the wearable device 83 may transmit vehicle control features/functions to the vehicle computing system 1 based on one or more mobile applications executed at the nomadic device 53.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
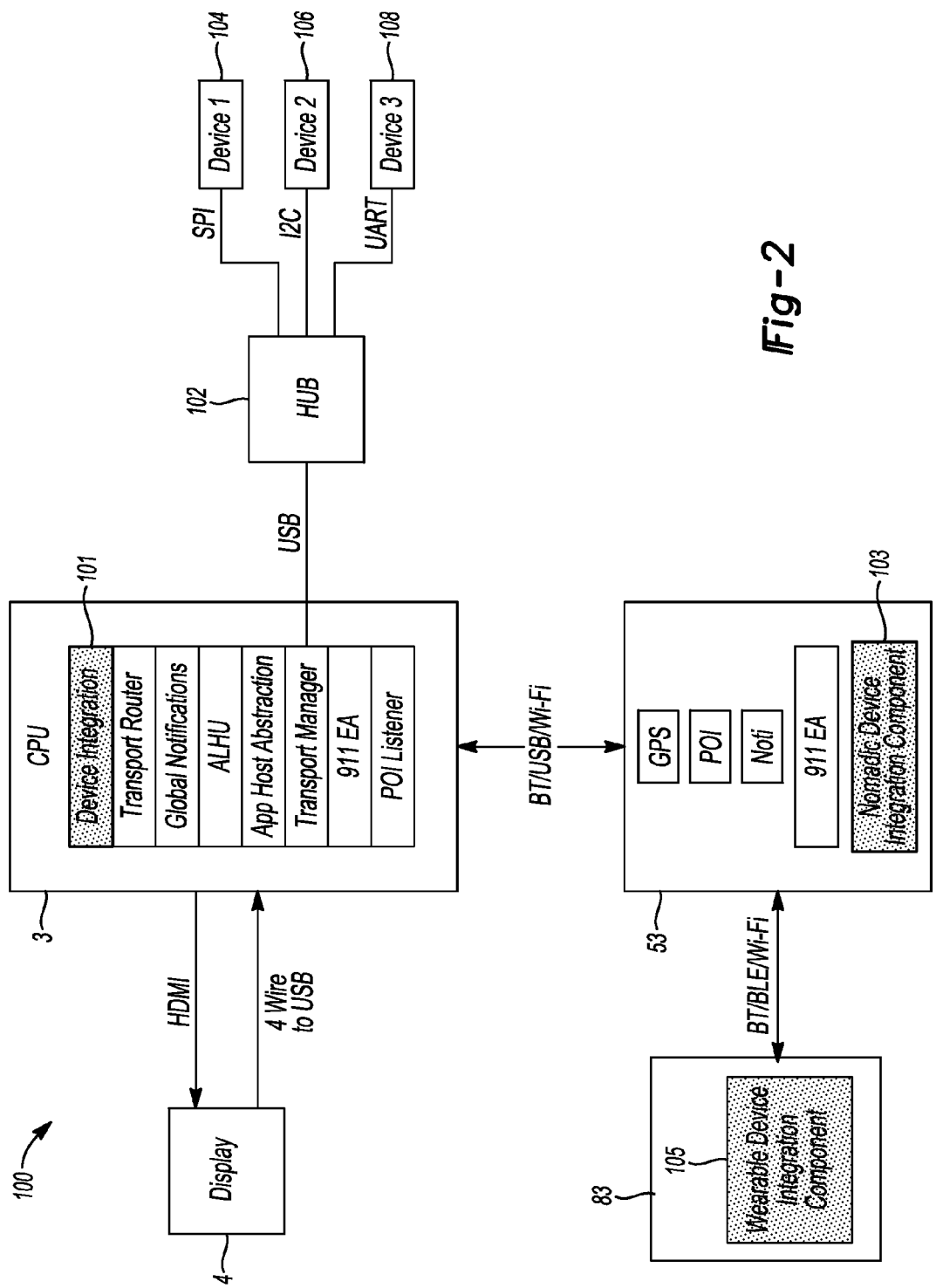
FIG. 2 is an exemplary block topology of a system for integrating one or more connected devices with the vehicle based computing system according to an embodiment.

FIG. 2 is an exemplary block topology of a system 100 for integrating one or more connected devices with the VCS 1. The CPU 3 may be in communication with one or more transceivers. The one or more transceivers are capable for wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, accident detection notification (i.e., 911 ASSIST™), vehicle access control (e.g., locking and unlocking the vehicle doors), and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 (e.g., smart phone) to take advantage of the services provided by the device integration framework 101. The device integration client component 103 may be referred to as an application. The application is executed on hardware of the nomadic device 53. The application may communicate data from the nomadic device to the VCS 1 via the transceiver.

The nomadic device 53 may communicate application data with the wearable device 83 via wireless technology. The wireless technology may include Bluetooth Low Energy (BLE). The wearable device 83 may receive application data executed at the nomadic device 53 using a wearable device integration component 105. The wearable device integration component 105 may allow the wearable device 83 to take advantage of the services provided by the device integration framework 101 and the device integration client component 103. For example, the wearable device 83 may receive application data including one or more control functions for the vehicle. The wearable device 83 may receive one or more control function inputs via a user interface and transmit the inputs to the nomadic device 53. In one example, the wearable device 83 may receive a control function request such as an unlock door request from a user and transmit that control function request to the CPU 3 via the nomadic device 53.

The one or more transceivers may include a multiport connector hub 102. The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Figure 3:
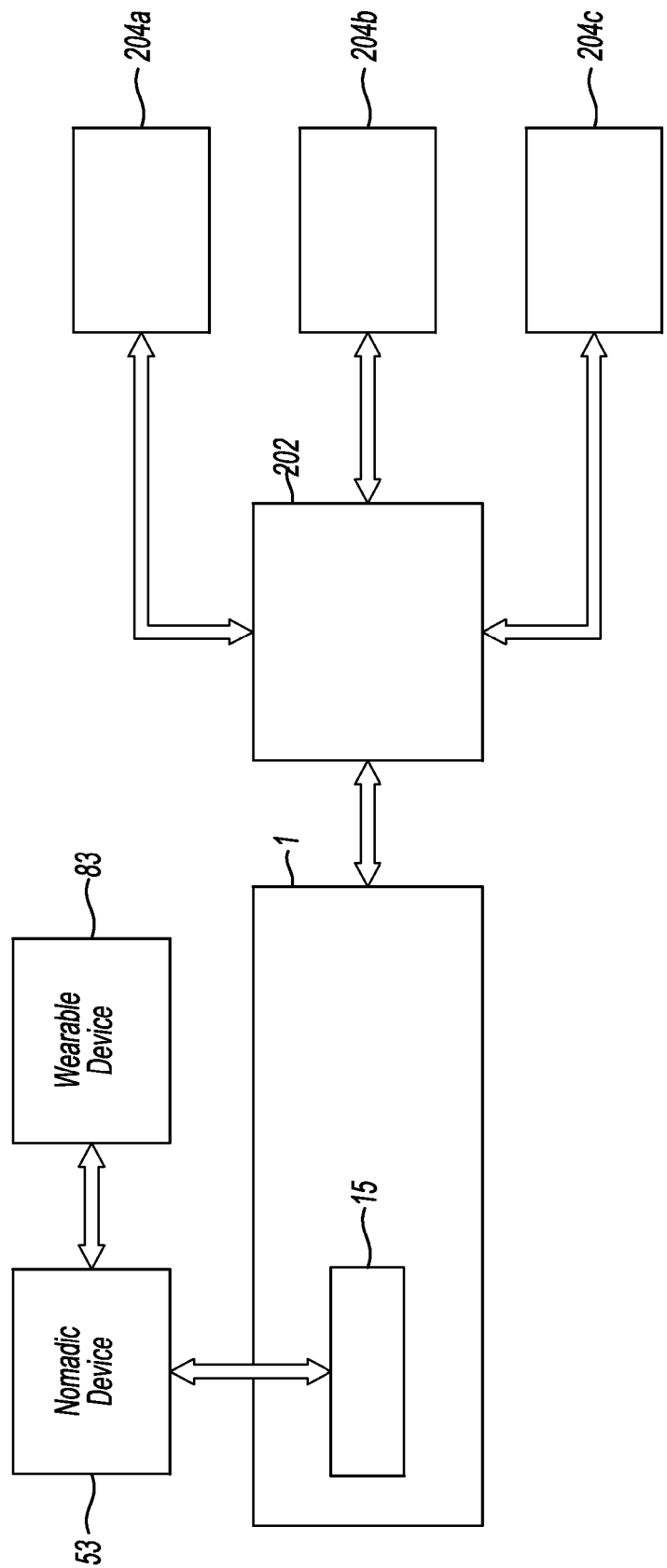
FIG. 3 is an exemplary block topology of a system for enabling Bluetooth Low Energy with the vehicle computing system according to an embodiment.

FIG. 3 is an exemplary block topology of a system for enabling Bluetooth Low Energy with the vehicle computing system according to an embodiment. The system may include Bluetooth transceiver 15 embedded with the VCS 1. For example, the wireless broadcasted signal 14 may be generated by the wireless transceiver 15. The wireless broadcast signal 14 may notify the presence of the VCS 1 to the nomadic device 53. For example, the wireless transceiver 15 may include, but is not limited to, a beacon broadcast such as Bluetooth low energy advertisement. An example of Bluetooth low energy advertisement may include an iBeacon broadcast. The wireless transceiver generating the iBeacon signal may include, but is not limited to, a low-powered wireless transceiver 15. The iBeacon broadcast generated by the wireless transceiver 15 may send a push notification to the nomadic devices (i.e., wireless devices) in close proximity of the VCS 1.

The iBeacon may use a Bluetooth Low Energy (BLE) proximity sensing to transmit a universally unique identifier (UUID). The UUID is an identifier standard that may be used to uniquely identify the application on the nomadic device 53 associated with the VCS 1. For example, the nomadic device 53 may include an application with the UUID (e.g., a sixty-four hexadecimal character identifier). The VCS 1 may transmit the iBeacon broadcast comprising the UUID via the transceiver 15. The iBeacon broadcast may be transmitted to one or more nomadic devices 53 in proximity of the vehicle 31. The iBeacon broadcast may include the UUID associated with the application stored at the nomadic device 53.

In another example, the VCS may have one or more UUIDs associated with an application, a control module, and/or a combination thereof. The VCS may transmit an UUID based on one or more predefined conditions. The one or more predefined conditions may include a vehicle operation state, an ignition state, a location, and/or a combination thereof. For example, if the vehicle ignition is in an off state, the VCS may transmit UUID for a key fob application enabling remote control of vehicle entry functions.

The nomadic device 53 may receive the UUID in which the operating system 204 may process. The nomadic device 53 may determine if an application 208 matches the UUID. In one example, the application may be assigned the UUID by a developer using a software development kit. If a match is found, the nomadic device 53 may launch the application. The nomadic device 53 may launch the application via the iBeacon UUID in several application operating states including, but not limited to, running in the background, suspended, and/or in a terminated state.

For example, the nomadic device 53 may receive the iBeacon comprising the UUID. The application associated with the UUID may be the key fob application associated with the vehicle. The key fob application may enable the nomadic device 53 to perform various key fob functions such as locking and unlocking the doors, opening the trunk, and starting the powertrain. In response to the key fob application being launched and/or wakened-up, the nomadic device 53 may communicate the various key fob functions to the wearable device 83. In one example, the wearable device 83 may be a smartwatch 83 having one or more user inputs. The one or more user inputs at the smartwatch 83 may include a touch screen, soft button inputs, hard button inputs, and a combination thereof. The key fob functions may be assigned to the touch screen and/or the button inputs of the smartwatch 83 device.

For example, a user may select to unlock the vehicle doors using a button input at the smartwatch 83. The smartwatch 83 may receive the unlock request via the user input and wirelessly transmit the unlock request to the nomadic device 53. The nomadic device 53 may receive the unlock request and transmit the request to the VCS 1 via the key fob application.

The VCS 1 may receive the unlock request from the smartwatch 83 via the wireless communication with the nomadic device 53. The VCS 1 may have a vehicle network 202 such as a controller area network (CAN) Bus, local interconnect network (LIN) and others used to communicate with one or more control modules 204. The VCS 1 may transmit the unlock request to the one or more control modules 204 to command the locking mechanism to unlock the door. For example, the one or more control modules 204 may include a body control module (BCM) 204a, powertrain control module 204b, and/or a heating, ventilation and air conditioning (HVAC) module 204c. The BCM 204a may be responsible for controlling the locking mechanism that locks and unlocks the vehicle door. The VCS 1 may communicate the unlock request received from the nomadic device to the BCM 204*a* via the vehicle network 202.

In another example, a user may select to start the vehicle using a button input at the smartwatch 83. The smartwatch 83 may receive the start request via the user input and wirelessly transmit the start request to the nomadic device 53. The nomadic device 53 may receive the start request and transmit the request to the VCS 1 via the key fob application. The VCS 1 may receive the start request from the smartwatch 83 via the nomadic device 53. The VCS 1 may transmit the start request to the powertrain control module 204*b* via the vehicle network 202.

In another example, a user may select a temperature setting for the vehicle HVAC using the touchscreen at the smartwatch 83. The smartwatch 83 may receive the temperature setting request via the user input and wirelessly transmit the temperature setting request to the nomadic device 53. The nomadic device 53 may receive the temperature setting and transmit the request to the VCS 1 via the key fob application. The VCS 1 may receive the temperature setting request from the smartwatch 83 via the nomadic device 53. The VCS 1 may transmit the temperature setting request to the HVAC module 204*c* via the vehicle network 202.

Figure 4:
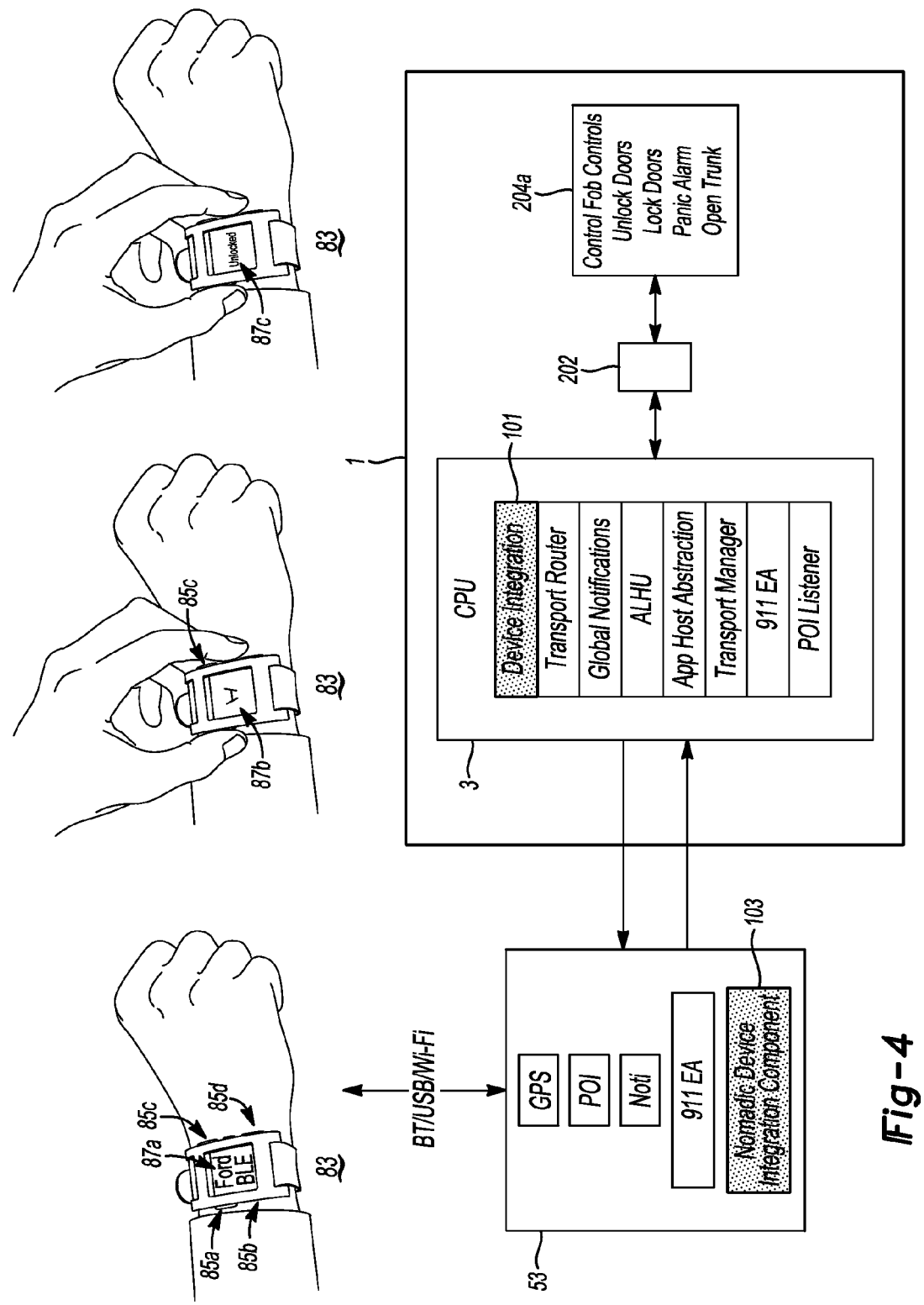
FIG. 4 is an exemplary block diagram illustrating the vehicle computing system in communication with a wearable device via the nomadic device.

FIG. 4 is an exemplary block diagram illustrating the vehicle computing system 1 in communication with the smartwatch 83 via the nomadic device 53. The VCS 1 may broadcast the iBeacon signal continuously, for predetermined time periods, at different vehicle states, and/or a combination thereof until a device is connected. For example, if the vehicle is in a power down state and parked, the VCS 1 may broadcast the iBeacon continuously. Once the nomadic device 53 gets within the range of the iBeacon signal, the nomadic device 53 may connect with the VCS via a wireless connection and use the UUID embedded in the iBeacon signal to retrieve the one or more applications associated with the vehicle.

For example, the nomadic device may launch and/or wakeup the key fob application. In response to the nomadic device 53 receiving the iBeacon signal and launching the key fob application, the smartwatch 53 may receive a message from the nomadic device 53 indicating that the vehicle has been detected. The smartwatch 83 may output a vehicle detection message including, but not limited to, a vibration, noise alert, text message at a display 87*a*, and/or a combination thereof.

In response to the key fob application being launched based on the iBeacon signal, the smartwatch 83 may receive a configuration message form the nomadic device 53. The configuration message may enable the smartwatch 83 to control one or more key fob functions. The one or more key fob functions may include unlocking the vehicle door. For example, the smartwatch may configure the hard button inputs on the side of the smartwatch 83 to open the trunk 85*a*, set the panic alarm 85*b*, unlock the doors 85*c*, and/or lock 85*d* the vehicle doors.

The smartwatch 83 may receive an unlock request from a user pressing on the hard button 85*c*. The unlock request may be transmitted to the VCS 1 via the nomadic device 53. The smartwatch 83 may provide feedback to the user to acknowledge that the unlock request is being commanded by outputting a message at the display 87*b*, vibrating, a noise alert, and/or a combination thereof.

For example, the smartwatch 83 may receive a unlock request via the hard button 85*c*. The smartwatch 83 may transmit the unlock request to the VCS 1 via the wireless communication link with the nomadic device 53. The VCS 1 may receive the unlock request at the CPU 3 and communicate the request to the control module (e.g., BCM 204*a*) responsible for controlling the door locking mechanisms via the vehicle network communication module 202. The BCM 204*a* may unlock the one or more doors of the vehicle based on the unlock request. In response to unlocking the one or more doors, the BCM 204*a* may transmit an unlock completion message to the CPU 3 via the vehicle network. The VCS 1 may transmit the unlock completion message to the smartwatch 83 via the wireless communication link with the nomadic device 53. The smartwatch may acknowledge the receipt of the unlock completion message from the VCS 1 by outputting a message at the display 87*c*, vibrating, a noise alert, and/or a combination thereof.

Figure 5:
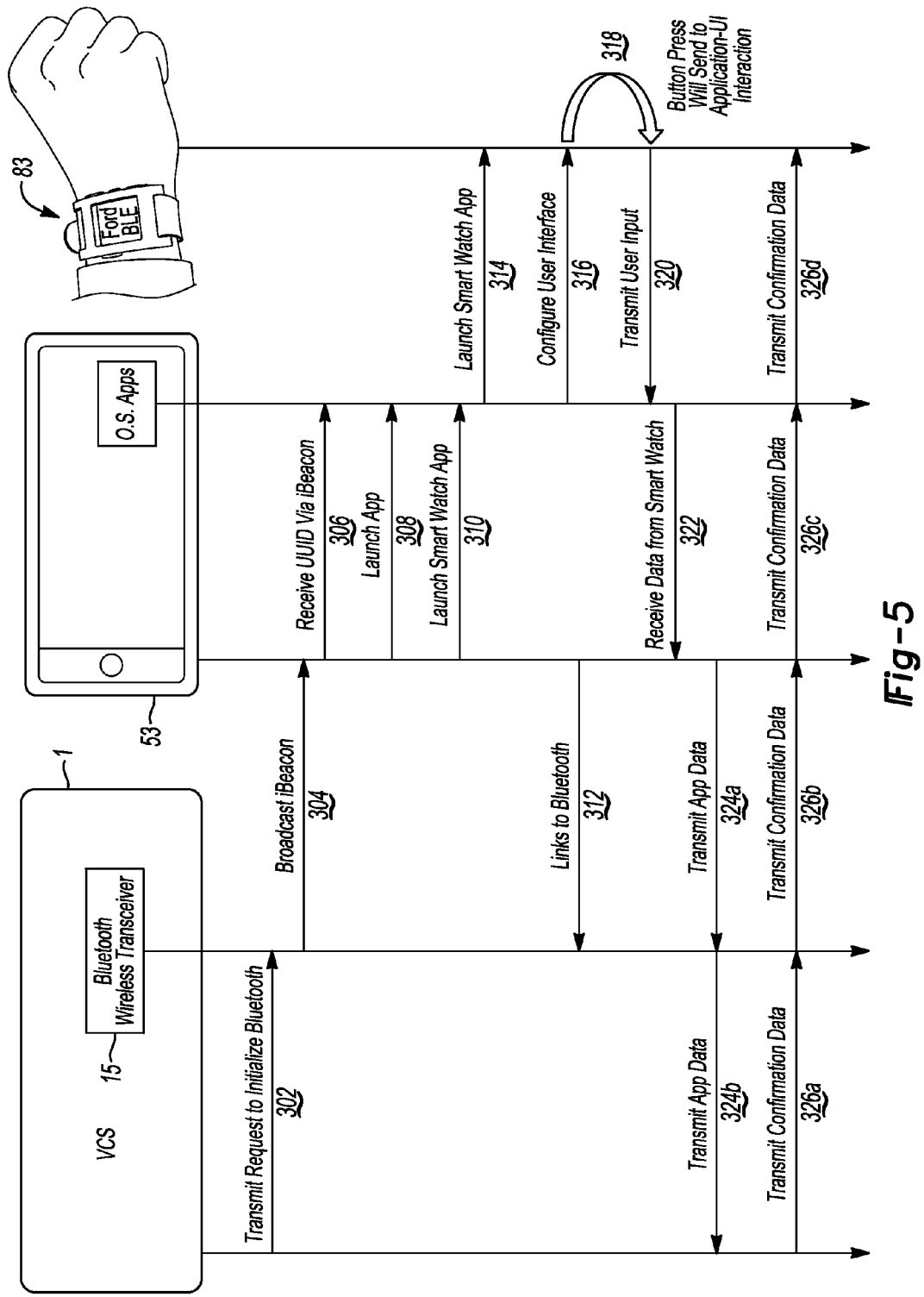
FIG. 5 is a flow chart illustrating an example method of the vehicle computing system communicating a beacon signal to the nomadic device for executing an application at the smartwatch according to an embodiment.

FIG. 5 is a flow chart illustrating an example method of the vehicle computing system 1 communicating a beacon signal to the nomadic device 53 for executing a smartwatch application according to an embodiment. The VCS 1 may establish wireless connection with the smartwatch 83 via the nomadic device 53. The VCS 1 may communicate with one or more applications on the smartwatch 83 based on the established wireless connection with the nomadic device 53. The VCS 1 may comprise one or more applications executed on hardware of the system to transmit the broadcast having a predefined UUID. The broadcast signal may be used to automatically launch an application residing at the nomadic device 53 that may be executed on, and interactive with, the smartwatch 83.

The VCS 1 may transmit a request to initialize 302 the Bluetooth wireless transceiver 15 based on the wakeup signal, a predefined periodic broadcast pulse, and/or a combination thereof. The Bluetooth wireless transceiver 15 may broadcast a wireless protocol 304, such as iBeacon, to provide a means of sending notifications to the nomadic device 53. The iBeacon broadcast may comprise one or more UUIDs. The one or more UUIDs may be predefined by a user, original equipment manufacturer, a control module, and/or a combination thereof.

For example, the UUID may be defined by the BCM. The Bluetooth wireless transceiver 15 may receive the UUID defined by the BCM for broadcasting when the VCS 1 is in a predefined vehicle state. The predefined vehicle state may include a power down state when the ignition is in the off position.

The nomadic device 53 may receive 306 the UUID via the iBeacon. The nomadic device 53 may search in the operating system software database for the mobile application that matches the UUID received from the VCS 1. The nomadic device 53 may find the application that is associated with the UUID received form the VCS 1. The nomadic device 53 may launch 308 the application having the UUID even if the application is in the background, suspended, terminated, and/or the nomadic device is locked. The application being launched at the nomadic device may have a corresponding smartwatch application.

The nomadic device 53 may launch 310 the smartwatch application. The nomadic device 53 may transmit one or more instructions to configure 316 the user interface of the smartwatch 83 based on the smartwatch application. The smartwatch 83 user interface may include, but is not limited to, a touch screen display, soft buttons, hard buttons, and/or a combination thereof.

The nomadic device 53 may establish a communication link 312 via the wireless protocol (i.e., iBeacon) using the mobile application's Bluetooth service. The mobile application being launched at the nomadic device may transmit application data to the VCS 1. The application data may include, but is not limited to, a status bit informing the VCS 1 that the application is running. The Bluetooth wireless transceiver 15 may transmit the application data to the one or more processors at the VCS 1 for execution.

The smartwatch 83 may receive a request 318 via the user interface to command one or more functions of the smart phone application. The smartwatch 83 may transmit the user input data 320 to the nomadic device 53. The nomadic device 53 may receive the data 322 from the smartwatch 83. The nomadic device 53 may transmit the data 324 from the smartwatch 83 to the VCS 1.

For example, the smartwatch application may be a key fob application to remotely control one or more functions of the vehicle. The one or more functions of the vehicle may include locking and unlocking the vehicle doors, starting the vehicle, opening up the vehicle trunk, and enabling the panic alarm. The smartwatch may configure the user interface to include the one or more functions. The configuration may include the unlocking and locking of vehicle doors to be assigned to the hard buttons of the smartwatch 83. The unlocking request may be received at the hard button of the smartwatch 83. The smartwatch 83 may transmit the unlocking request to the nomadic device 53 via a wireless connection. The nomadic device 53 may transmit the unlocking request to the VCS 1.

The VCS 1 may receive the application data 324*a* from the nomadic device 53 using the Bluetooth wireless transceiver 15. The VCS 1 may receive the application data via the Bluetooth wireless transceiver 15 and transmit the data to one or more control modules within the system. The VCS 1 may confirm that the application data was received and executed by transmitting a confirmation data message 326*a*. The confirmation data message 326*b* may be transmitted to the nomadic device 53 via the Bluetooth transceiver 15. The nomadic device 53 may receive the confirmation data 326*c* from the VCS 1 and transmit the data to the smartwatch 83. The smartwatch 83 may receive the VCS confirmation data 326*d* and output one or more messages based on the data. For example, the one or more messages may include confirmation that the unlock request was received and the vehicle door(s) are unlocked.

Figure 6:
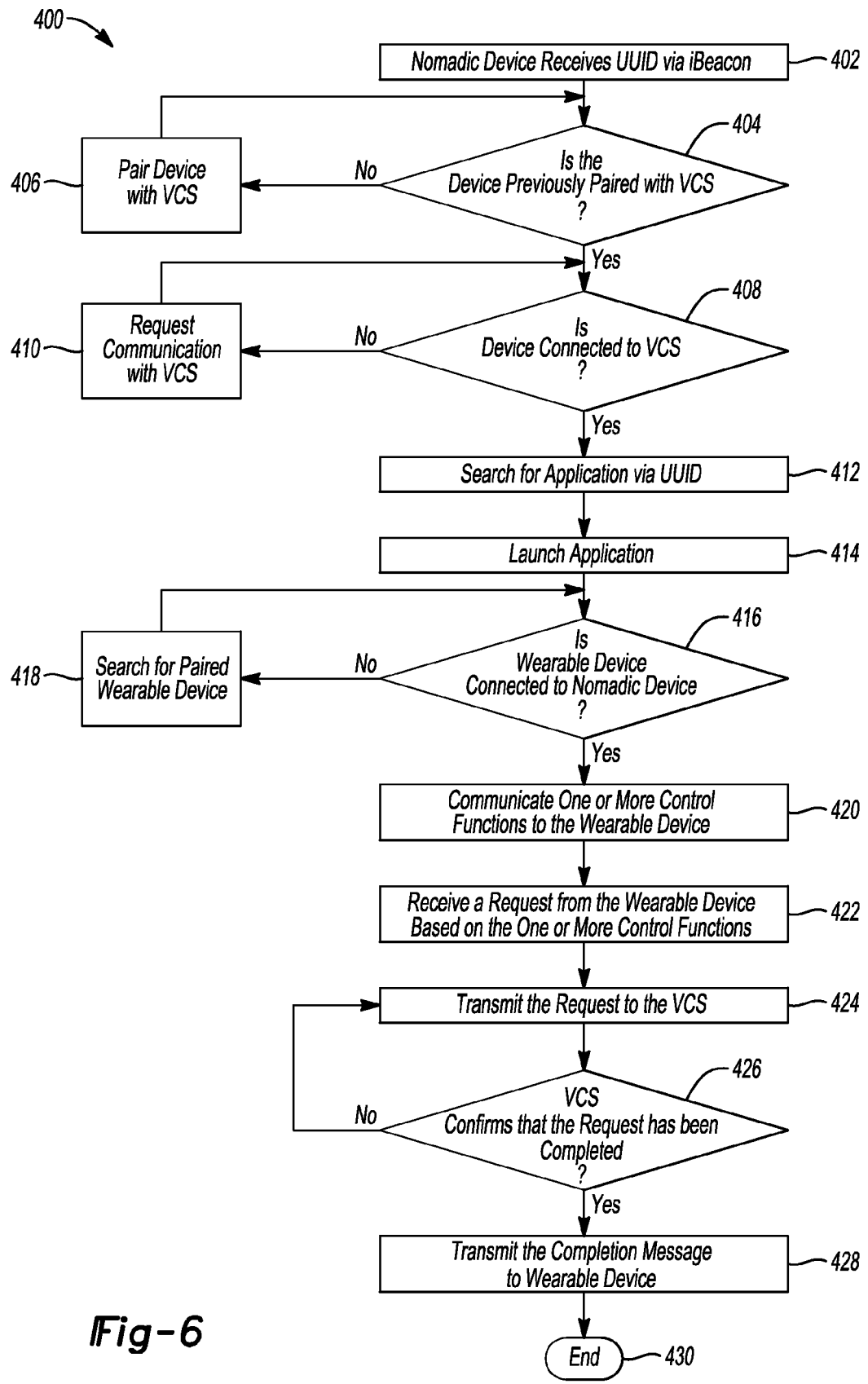
FIG. 6 is a flow chart illustrating an example method of the nomadic device receiving the beacon signal to launch the application at the wearable device according to an embodiment.

FIG. 6 is a flow chart illustrating an example method of the nomadic device receiving the beacon signal (e.g., iBeacon) to launch an application executed at the wearable device according to an embodiment. The method 400 may be implemented using software code contained within the nomadic device, wearable device, VCS, and a combination thereof.

Referring again to FIG. 6, the vehicle and its components illustrated in FIG. 1, FIG. 2, FIG. 3, FIG. 4 and FIG. 5 are referenced throughout the discussion of the method to facilitate understanding of various aspects of the present disclosure. The method 400 of launching the application at the smartwatch via a communication link between the VCS and nomadic device may be implemented through a computer algorithm, machine executable code, or software instructions programmed into a suitable programmable logic device(s) of the vehicle, such as the vehicle control module, the nomadic device control module, smartwatch control module, another controller in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, the nomadic device may recognize the beacon broadcast once the device has entered an acceptable range to receive the broadcast from the VCS. The beacon broadcast may include an UUID to identify one or more applications at the nomadic device associated with the VCS. The beacon broadcast may include iBeacon.

In operation 404, the nomadic device may determine if a wireless connection has been previously paired with the VCS. If the nomadic device has not been paired with the VCS, the device may request pairing before enabling automatic launching of an application based on the beacon broadcast in operation 406.

In operation 408, if the nomadic device has been previously paired with the VCS, the device may establish a wireless connection with the VCS. If a wireless connection is not established with the VCS, the device may transmit a request to wirelessly connect with the VCS in operation 410.

In operation 412, if the device is in communication with the VCS, the device may receive the UUID via the broadcast and begin to search for an application having the same UUID. Once the nomadic device has found a mobile application that is a match to the UUID, the device may begin to launch the application in operation 414. The application executed at the nomadic device may be configured to communicate with a wearable device.

In operation 416, the nomadic device may determine if a wearable device (i.e., smartwatch) is connected to communicate with the device. If the nomadic device does not recognize a wearable device connected, the device may search for a paired wearable device in operation 418.

In operation 420, in response to the launch of the application, the nomadic device may communicate one or more control functions to the wearable device. For example, the application at the nomadic device associated with the UUID may have a smartwatch application. The smartwatch application may be executed at the smartwatch (i.e., wearable device) allowing for one or more control functions to be configured at the smartwatch user interface. The one or more control functions may be communicated from the smartwatch to the nomadic device via the wireless communication.

In operation 422, the nomadic device may receive a control function request at the wearable device user interface. The nomadic device may transmit the request to the VCS in operation 424.

In operation 426, the nomadic device may receive a confirmation message from the VCS notifying the device that the request has been received by the system. If the nomadic device has not received the VCS confirmation message, the device may re-transmit the request to the VCS.

In operation 428, the nomadic device may transmit the completion message to the wearable device. For example, if the smartwatch transmits an unlock door request to the VCS via the nomadic device, the VCS may transmit a confirmation message that the doors are now unlocked.

In operation 430, the nomadic device may disable the one or more applications if a user request to turn them off and/or the nomadic device and/or wearable device is powered down. The mobile application may be woken up and/or re-initialized if a request is received by the VCS via the beacon broadcast.

Figure 7:
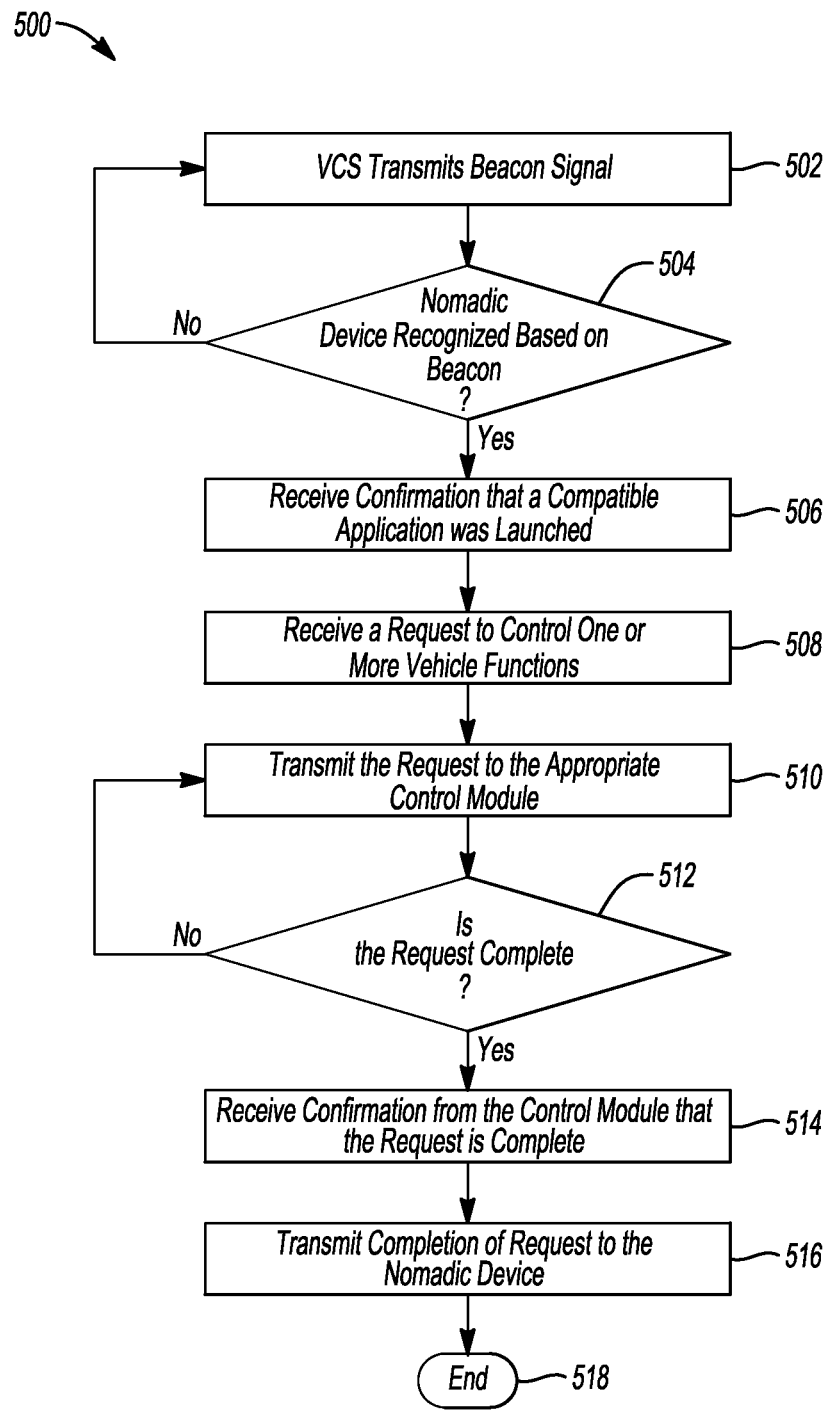
FIG. 7 is a flow chart illustrating an example method of the vehicle computing system managing communication with the nomadic device using the beacon signal.

FIG. 7 is a flow chart illustrating an example method 500 of the vehicle computing system managing communication with the nomadic device using the beacon broadcast signal (e.g., iBeacon). The method 500 may be implemented using software code contained within the VCS 1. In other embodiments, the method 500 may be implemented in other vehicle controllers, or distributed amongst multiple vehicle controllers.

In operation 502, the VCS may broadcast the iBeacon transmission via BLE. The iBeacon protocol may wake up one or more applications at the nomadic device. The iBeacon may transmit an UUID such that a compatible application or operating system may be commanded to trigger action at the nomadic device, wearable device, and/or a combination thereof. The nomadic device (i.e., mobile device) may receive the iBeacon broadcast from the VCS. The mobile application and VCS are connected via BLE after passing appropriate security handshakes and protocols in operation 504.

In operation 506, the VCS may receive confirmation from the nomadic device and/or wearable device that the iBeacon was received and/or the compatible application has been launched. The VCS may periodically check that the mobile application is running in the background and is communicating to the VCS.

In one example, the VCS may implement a security process to ensure that communication with the mobile application is acceptable for use in the vehicle. The VCS may transmit a token to authenticate the nomadic device and/or wearable device. The token ensures that the nomadic device and/or wearable device may be acceptable to communicate with the VCS. In another example, a message protocol may be used to encode messages exchanged between the nomadic device, wearable device, and the VCS to command and control authorized communication.

In operation 508, the VCS may receive a request, via the nomadic device, to control one or more vehicle functions from the mobile application executed at the wearable device. The VCS 1 may transmit the one or more vehicle functions to the appropriate control module, via the vehicle network, in operation 510.

In operation 512, the VCS may get confirmation that the one or more control modules executing the vehicle control function request has been executed accordingly. For example, if the VCS receives an unlock door request from the wearable device, the system may transmit data to the BCM. The BCM may transmit a confirmation message that the unlock request is complete. The VCS may receive confirmation from the appropriate control module that the request is complete in operation 514.

In operation 516, the VCS may transmit the completion message to the wearable device via the nomadic device communication link. The VCS may discontinue communication with the nomadic device and/or wearable device based on several factors including, but not limited to, the location of the nomadic device and/or the system being requested to power-down in operation 518. It must be noted that the mobile application at the nomadic device and/or wearable device may continue to generate and transmit information after communication is discontinued with the VCS.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle computing system comprising:
   at least one controller, in a vehicle network, configured to establish wireless communication via a wireless transceiver using a wireless protocol, the at least one controller configured to,
   transmit using the wireless protocol a signal including a unique user identification identifying an application on a nomadic device in response to detecting a predetermined condition,
   receive a confirmation that the nomadic device launched the application in response to identifying a match between a stored unique user identification and the transmitted unique user identification and is in communication with the application via the transceiver,
   receive one or more control functions from a smartwatch in communication with the nomadic device based on the application; and
   transmit the one or more control functions to a control module via the vehicle network.

2. The vehicle computing system of claim 1, wherein the one or more control functions are at least one of unlocking a vehicle door, locking the vehicle door, starting a powertrain, opening a vehicle trunk, and enabling a vehicle alarm.

3. The vehicle computing system of claim 1, wherein the control module is a body control module.

4. The vehicle computing system of claim 1, wherein the signal transmitted via the wireless transceiver is an iBeacon broadcast comprising the unique user identification.

5. The vehicle computing system of claim 1, wherein the unique user identification has an address that corresponds to an application at the nomadic device.

6. The vehicle computing system of claim 1, wherein the application provides the one or more control functions such as unlocking a door.

7. A method comprising:
   in response to wirelessly receiving a signal having an identifier from a vehicle computing system, identifying an application associated with a stored identifier that matches the received identifier;
   launching the identified application;
   executing a vehicle function at a controller based on the application;
   transmitting the vehicle function to a smartwatch; and
   configuring a user interface input at the smartwatch in communication with the controller based on the vehicle function.

8. The method of claim 7, wherein the vehicle function is unlocking a vehicle door.

9. The method of claim 7, wherein the vehicle computing system is one or more controllers communicating within a vehicle network.

10. The method of claim 9, wherein the one or more controllers is a body control module controlling a locking mechanism a vehicle door.

11. The method of claim 7, wherein the user interface input at the smartwatch is at least one of unlocking a vehicle door, locking a vehicle door, starting a powertrain, opening a vehicle trunk, or enabling a vehicle alarm.

12. The method of claim 7, wherein the signal is a Bluetooth beacon device broadcast comprising the identifier.

13. The method of claim 12, wherein the Bluetooth beacon device broadcast is an iBeacon broadcast.

14. The vehicle computing system of claim 1, wherein the predetermined condition includes one of a predetermined vehicle operating state, a predetermined ignition state, or a predetermined vehicle location.

\* \* \* \* \*